UNITED STATES PATENT OFFICE.

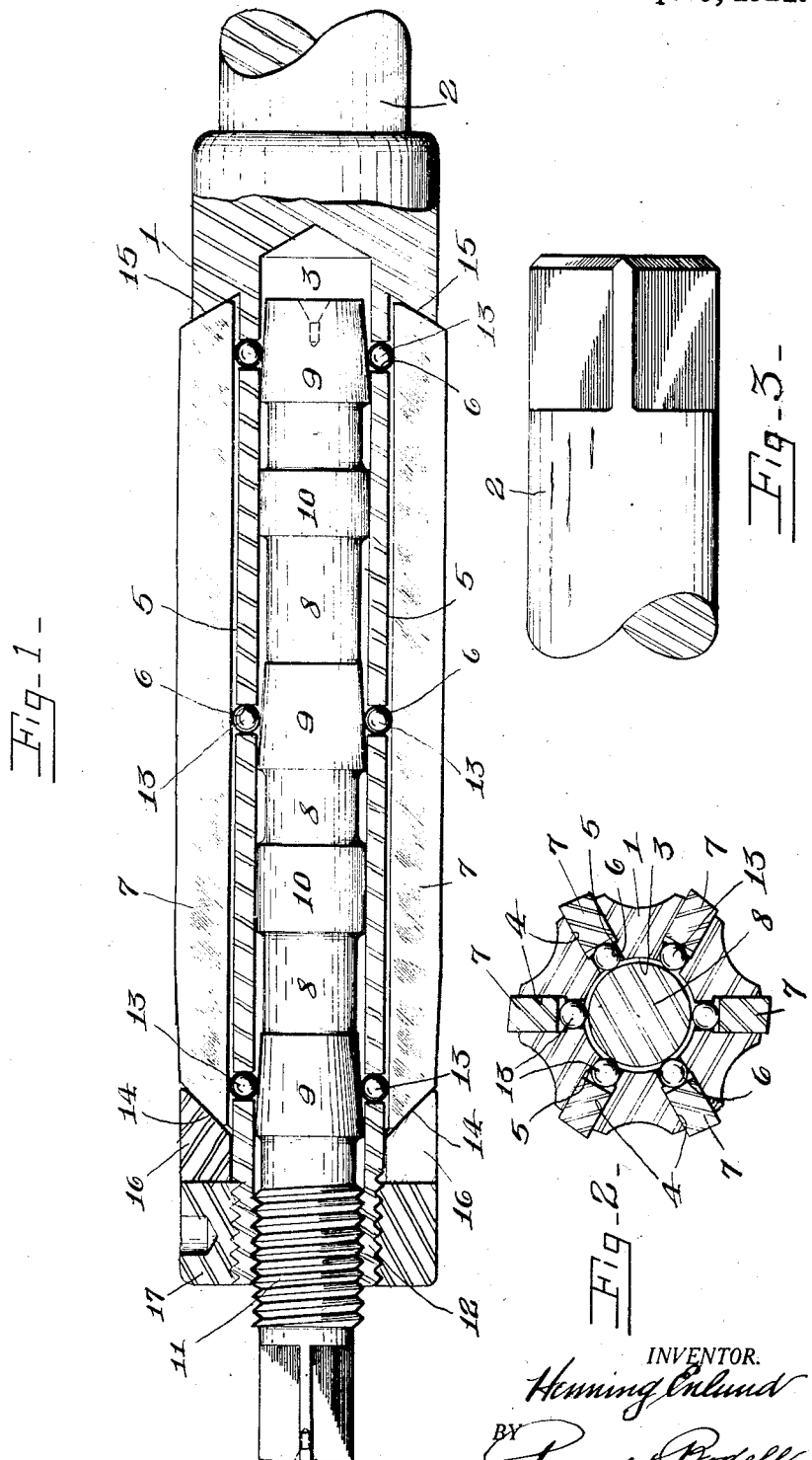

HENNING ENLUND, OF SYRACUSE, NEW YORK.

REAMER.

1,373,717.  Specification of Letters Patent.  Patented Apr. 5, 1921.

Application filed May 16, 1919. Serial No. 297,521.

*To all whom it may concern:*

Be it known that I, HENNING ENLUND, a citizen of the United States, and a resident of Syracuse, in the county of Onondaga and State of New York, have invented a certain new and useful Reamer, of which the following is a specification.

This invention has for its object an expansible reamer which is particularly simple in construction, readily operable and highly efficient and durable in use; it consists in the novel features and in the combinations and constructions hereinafter set forth and claimed.

In describing this invention, reference is had to the accompanying drawings in which like characters designate corresponding parts in all the views.

Figure 1 is a longitudinal sectional view, partly in elevation of a preferable embodiment of my expansible reamer.

Fig. 2 is a sectional view thereof on line 2—2, Fig. 1.

Fig. 3 is a detail view of the shank of the portion broken away in Fig. 1.

This reamer or cutting tool comprises an elongated body 1 cylindrical in general outline and having a shank 2 by means of which it is attached to a spindle or a chuck.

The body 1 is formed with the lengthwise bore 3 opening through its outer end so that the body is substantially tubular. It is also formed with peripheral lengthwise grooves 4 spaced apart around its periphery, the grooves being separated from the bore of the hollow body by partitions 5 constituting the bottoms of the grooves. In other words, the grooves do not open into the interior of the body.

The bottoms 5 of the grooves are formed with passages or perforations 6 at intervals. Each bottom is here shown as formed with three passages 6 or perforations located near the ends of the groove and intermediate of the ends thereof. These passages open into the interior of the hollow body.

7 designates the cutters or blades which are located in the grooves 4.

8 is an expander extending lengthwise of the bore 3 of the body and being provided with cones 9, here shown as three in number opposite to the passages or perforations 6 and also with cylindrical bearing surfaces 10 between the cones which passages hold the expander centered.

The expander is moved inwardly and outwardly and as here shown the outer end portion thereof is threaded at 11 and threads into the threaded outer end 12 of the body. The motion of the expander is transmitted to the cutters 7 to move the same outwardly or permit the same to move inwardly by means extending through the perforations 6 and as here shown this means comprises balls 13, one ball being located in each perforation.

The outer end 12 of the body 1 is reduced in diameter and the outer ends of the grooves 7 open through the end wall of the reduced portion and also the outer ends of the cutters project slightly beyond this end wall of said reduced portion and are formed with bevel faces 14. The rear ends of the cutters are also formed with bevel faces 15 which coact with the undercut end wall at the rear ends of the grooves 4.

16 is a retaining ring mounted on the reduced portion 12 of the body 1, the retaining ring being formed with a conical socket which engages the bevel end edges 14 of the cutters, hence the cutters are retained in position at their ends by the conical socket of the ring 16 coacting with the bevel edges 14 at the outer ends of the cutters and by the undercut walls at the rear ends of the grooves 4 coacting with the bevel edges 15 at the rear ends of the cutters.

The retaining ring 16 is held in position by means of a nut 17 turning on the extreme threaded outer end of the reduced end portion 12, this nut pressing the retaining ring axially endwisely and the nut in turn presses the cutters endwisely.

The screwing of the nut 17 onto the body 1 also tends to press the cutters 7 radially inwardly which in turn acting through the balls 13 tend to press the expander 9 axially outwardly and hence lock it from turning movement.

This reamer is particularly advantageous in that it is simple and strong in construction as the grooves 4 do not open into the interior of the body and hence there is ample stock in the body to withstand the torque and other strains incidental to the use of the tool. Owing to the use of the balls 13 the expanding mechanism is particularly simple and easily assembled. To expand the reamer the nut 17 is loosened and the expander 9 turned inwardly causing the cones 9 to force the balls 13 and hence the cutters 7 outwardly slightly and when the desired expansion is obtained the nut 17 is tightened and locks all the parts in their adjusted positions.

What I claim is:

A reamer comprising a body having a lengthwise internal bore and lengthwise peripheral grooves, the bottoms of the grooves being formed with passages at intervals opening into the bore of the body, cutters mounted in the grooves and a retaining ring at one end of the body and coacting with the cutters to hold the same in the grooves, an expander extending into the bore of the body, a ball located in each passage and coacting with the expander and with the inner edge of the adjacent cutter and means for operating the expander and holding it in its adjusted position, substantially as and for the purpose described.

In testimony whereof, I have hereunto signed my name, at Syracuse, in the county of Onondaga, and State of New York, this 5th day of May, 1919.

HENNING ENLUND.